United States Patent
Cheng et al.

(10) Patent No.: US 6,577,421 B1
(45) Date of Patent: Jun. 10, 2003

(54) ALIGNMENT SYSTEM AND METHOD FOR OPTICAL SATELLITE COMMUNICATION

(75) Inventors: Cecilia Y. Cheng, Redondo Beach, CA (US); Robert R. Hayes, Calabasas, CA (US); David A. Langsam, Los Angeles, CA (US); Andrew L. Strodtbeck, El Segundo, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/373,349

(22) Filed: Aug. 12, 1999

(51) Int. Cl.[7] ............................................. H04B 10/00
(52) U.S. Cl. ...................... 359/159; 359/152; 359/172
(58) Field of Search ................................ 359/172, 159, 359/110, 182, 193, 161, 153, 152

(56) References Cited

U.S. PATENT DOCUMENTS

| 4,867,560 A | * | 9/1989 | Kunitsugu | 359/159 X |
| 5,465,170 A | * | 11/1995 | Arimoto | 359/159 |
| 6,097,522 A | * | 8/2000 | Maerki et al. | 359/159 |
| 6,347,001 B1 | * | 2/2002 | Arnold et al. | 359/159 |

* cited by examiner

*Primary Examiner*—Thomas Mullen
(74) *Attorney, Agent, or Firm*—V. D. Duraiswamy; M. W. Sales

(57) ABSTRACT

An optical communication terminal transmits data via an optical signal with a transmit mirror positioned to direct the optical signal. The optical communication terminal includes a processor configured to develop a control signal for a mirror controller to establish an optimal position of the transmit mirror. The optical communication terminal further includes a modulator coupled to the processor that modulates the optical signal in accordance with a position of the transmit mirror during transmission of the optical signal. The optimal position of the transmit mirror may be established by a scanning routine that adjusts the position of the transmit mirror to a plurality of predetermined offset positions during transmission of the optical signal. The intensity of the optical signal as received by a further optical communication terminal is then determined and provided via modulation of a further optical signal transmitted back to the first-named optical communication terminal. The predetermined offset positions and the corresponding received intensities may then be utilized to determine the optimal position of the transmit mirror.

25 Claims, 5 Drawing Sheets

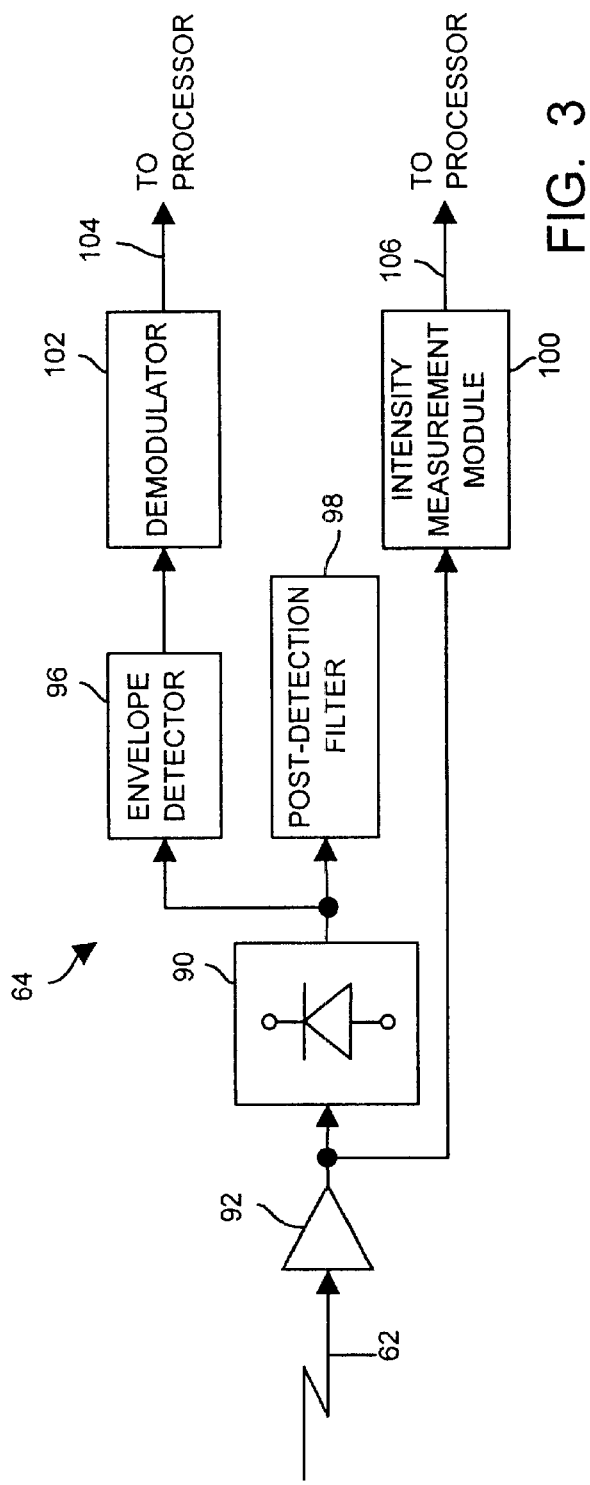
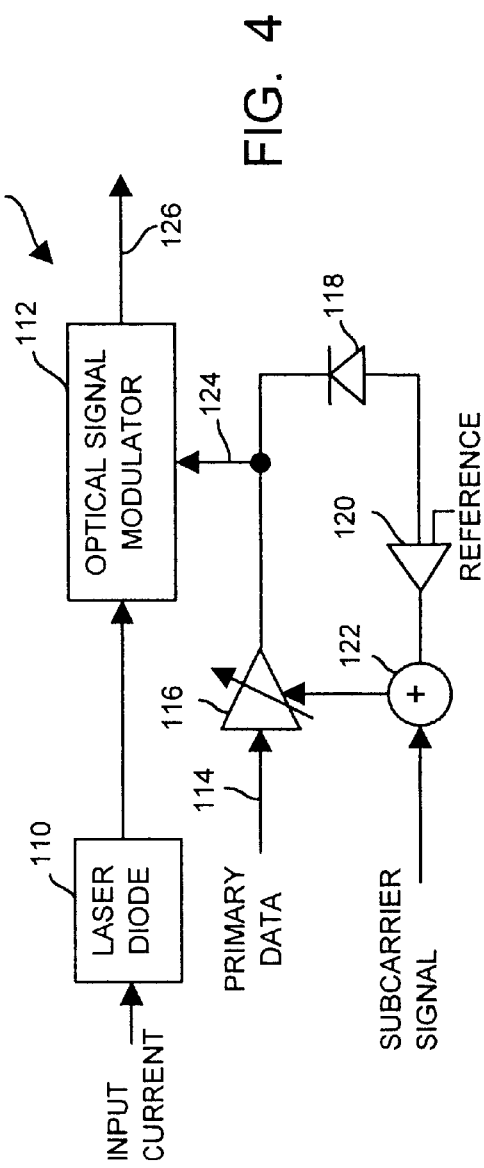

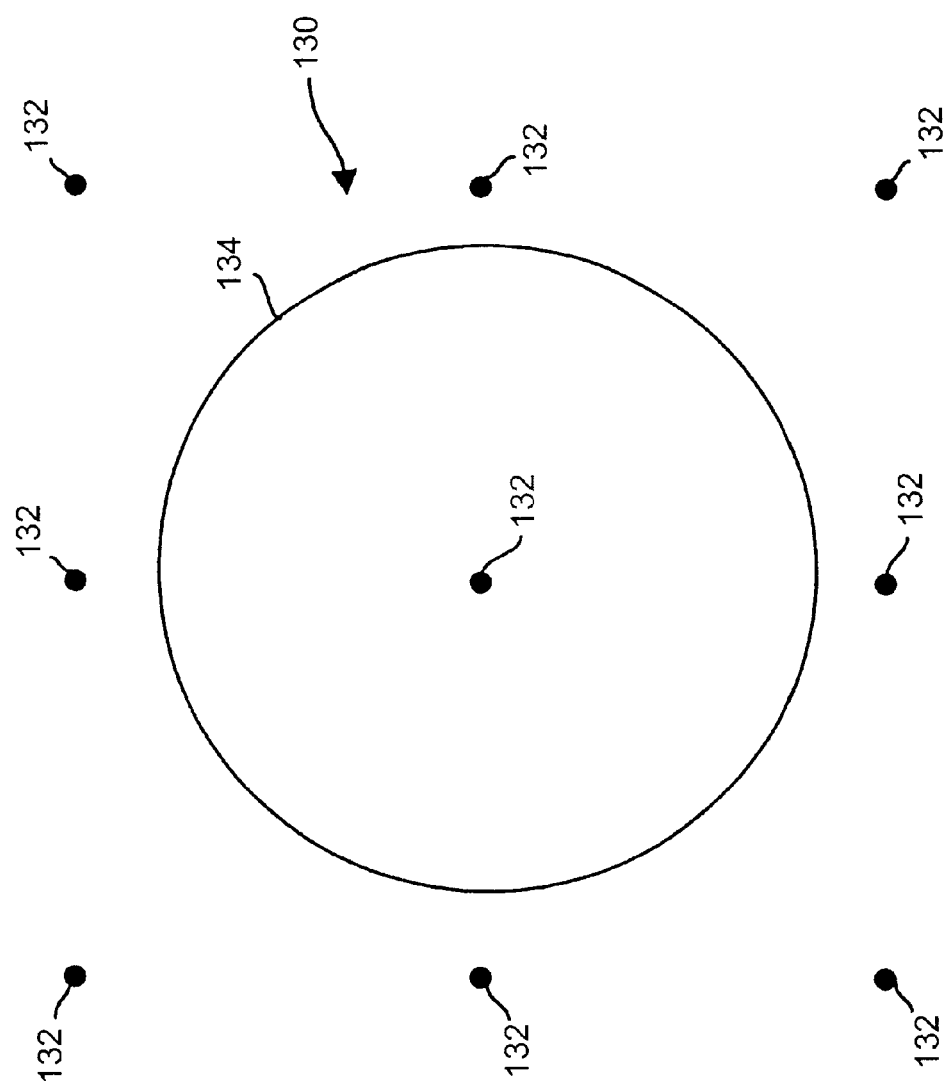

ALIGNMENT SYSTEM AND METHOD FOR OPTICAL SATELLITE COMMUNICATION

This invention was made with Government support. The Government has certain rights in this invention.

BACKGROUND OF THE INVENTION

1. Field of the Invention

The invention relates generally to optical fiber communication systems and, more particularly, to alignment systems and methods therefor.

2. Description of the Related Art

Optical fiber communication systems are presently being designed for free-space transmissions over long (unrepeated) distances. These communication systems include multiple fiber-based communication terminals that transmit and receive very narrow optical signals (i.e., beams) to avoid reliance on the high-power beams utilized heretofore. To transmit and receive such narrow beams in free space accurately, optical communication terminals require extremely precise alignment systems. For instance, a typical fiber-based communication terminal is designed to utilize a telescope having a field of view on the order of several microradians. With the telescope providing such a small target, the alignment system must compensate for numerous factors, including, for example, relative movement of the receiving terminal subsequent to transmission. Such compensation for relative movement between the terminals requires the transmitting terminal to calculate a "point-ahead" angle for transmission.

Prior proposed free space optical communication systems have relied on open-loop control for calculation of the point-ahead angle, but thermal effects, launch environment effects, actuator variation, and/or aging may cause the beam to drift away from the desired point-ahead angle. Thermal effects, in particular, may easily cause the relative positioning of various components in the communication terminal to change dramatically. These effects not only frustrate long-term alignment calibration for signal transmission, but also complicate alignment calibration for reception of an incoming beam that has accurately hit the telescope. Thus, alignment calibration challenges persist over the lifetime of the communication system for both signal transmission and reception.

The field of potential alignment calibration solutions is generally restricted by the nature of the communication terminal, inasmuch as the alignment system typically resides in the communications payload of a space-borne vehicle (i.e., a satellite). Competition exists between the communications payload and other equipment on the satellite as a result of limitations on both the size and weight of the payload.

SUMMARY OF THE INVENTION

In accordance with one aspect of the present invention, an optical communication terminal useful for transmitting data via an optical signal includes a transmit mirror positioned to direct the optical signal, a processor configured to develop a control signal to establish an optimal position of the transmit mirror, and a mirror controller coupled to the transmit mirror and responsive to the control signal. The optical communication terminal further includes a modulator coupled to the processor that modulates the optical signal in accordance with a position of the transmit mirror during transmission of the optical signal.

In accordance with another aspect of the present invention, an alignment calibration system is useful in a first optical communication terminal communicating with a second optical communication terminal. The inventive system includes a modulator that modulates a first data signal with a first alignment signal representative of an alignment offset taken by the first optical communication terminal during transmission of the first data signal by the first optical communication terminal to the second optical communication terminal. The inventive system further includes a demodulator responsive to a second data signal transmitted by the second optical communication terminal. The demodulator develops a second alignment signal representative of the alignment offset taken by the first optical communication terminal and an intensity of the first data signal as received by the second optical communication terminal. The inventive system still further includes a processor coupled to the demodulator and configured to determine an optimal alignment position from the alignment offset and the intensity.

In accordance with yet another aspect of the present invention, a method is useful for aligning a first communication terminal with a second communication terminal for optical transmission of data between the first communication terminal and the second communication terminal. The inventive method includes the steps of adjusting a mirror of the first communication terminal to a first position, modulating a first optical signal representative of the data in accordance with the first position, and transmitting the first optical signal from the first communication terminal to the second communication terminal. A second optical signal from the second communication terminal is then received to obtain an intensity of the first optical signal as received by the second communication terminal.

The inventive method then includes the step of adjusting the mirror of the first communication terminal to a second position.

In accordance with still another aspect of the present invention, a method is useful for aligning a first communication terminal and a second communication terminal. The inventive method includes the steps of adjusting a mirror of the first communication terminal to a plurality of predetermined offset positions from a first position, and transmitting, for each predetermined offset position, a respective first optical signal from the first communication terminal to the second communication terminal wherein each first optical signal is representative of the corresponding predetermined offset position. The inventive method further includes the step of receiving, for each predetermined offset position, a respective second optical signal from the second communication terminal to the first communication terminal wherein each second optical signal is representative of a respective intensity of the corresponding first optical signal as received by the second communication terminal. The inventive method still further includes the step of adjusting the mirror of the first communication terminal to a second position based on the plurality of predetermined offset positions and the corresponding received intensities.

In accordance with yet a further aspect of the present invention, a method of calibrating an alignment system for an optical communication terminal transmitting content via a data signal at a carrier frequency includes the steps of generating a digital alignment signal representative of alignment information, and frequency-modulating a subcarrier signal having a frequency lower than the carrier frequency with the digital alignment signal. The inventive method further includes the steps of modulating the data signal with the frequency-modulated subcarrier signal and transmitting the modulated data signal.

In accordance with still a further aspect of the present invention, a method is useful for controlling a mirror positioning system for an optical communication terminal. The inventive method includes the step of receiving intensity data associated with optical transmission of content at a plurality of mirror offset positions established by the mirror positioning system. The method further includes the step of determining an optimal mirror position to maximize transmission intensity via a parabolic fit of the intensity data.

BRIEF DESCRIPTION OF THE DRAWINGS

FIG. 3 is a schematic representation of a receiver module of the optical communication terminal of FIG. 2 in accordance with the present invention;

FIG. 4 is a schematic representation of a transmitter module of the optical communication terminal of FIG. 2 in accordance with the present invention;

FIG. 5 is a grid pattern showing a plurality of predetermined offset positions at which transmission occurs in accordance with the present invention.

DETAILED DESCRIPTION OF THE INVENTION

Figure 1:
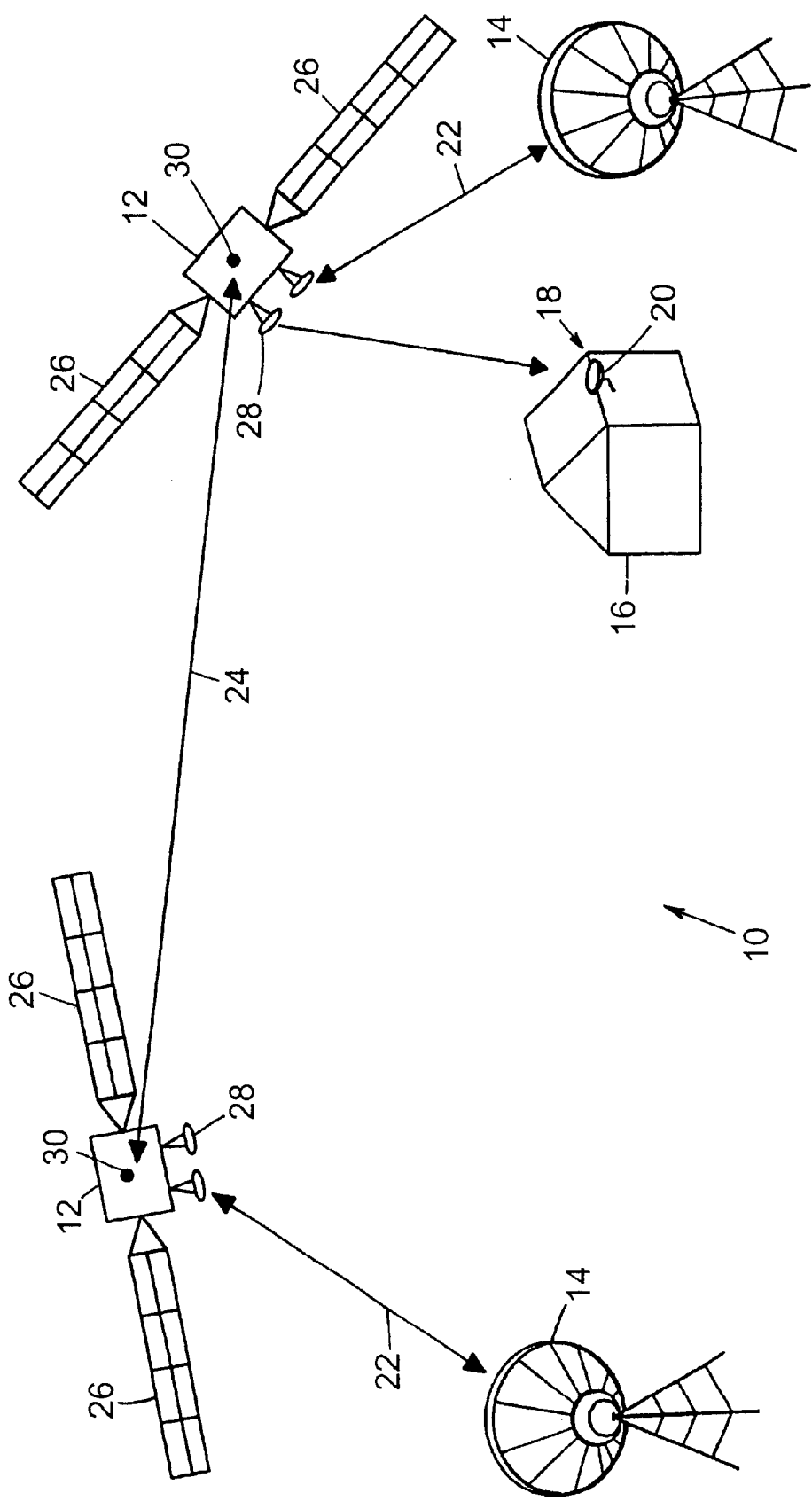
FIG. 1 is a schematic representation of a communication system suited for practice of the present invention.

Referring to FIG. 1, a communication system generally indicated at 10 includes one or more space-born vehicles 12 (e.g., a "satellite terminal") for long distance communication. Each satellite terminal 12 may communicate with an uplink facility 14 for bi-directional communication with a ground-based communication network (not shown). The network may further include individual residential or commercial units 16, each including a respective communication terminal generally indicated at 18. The terminal 18 may comprise an antenna 20 (i.e., receiver dish) that enables direct, one-way communication with one or more of the satellite terminals 12. Other components of a typical communication system depend largely on the content being transmitted and, therefore, vary to an extent well understood to those skilled in the art.

The satellite terminals 12 establish a communication link 22 with ground-based terminals such as the uplink facilities 14, as well as a communication link 24 between the satellite terminals 12 themselves. The communication links 22 and 24 have heretofore typically utilized a radio-frequency signal. The present invention, however, is applicable to a communication system in which one or more of the radio-frequency signals is replaced with an optical signal(s), such that one or more of the communication links 22 and 24 is established via a light beam (hereinafter "beam"). While the feasibility of establishing continuous or even intermittent optical communication between every terminal in the communication system 10 may be rather low, the principles of the present invention are equally applicable to any type of communication terminal that transmits and/or receives optical signals (i.e., an optical communication terminal). Accordingly, for the purposes of ease in description only, the satellite terminals 12 will be considered as the terminals between which an optical data signal representative of content is transmitted.

Each satellite terminal 12 has a typical payload, a portion of which is dedicated to handling the aforementioned communications (i.e., the "communications payload"). More generally, however, each satellite terminal 12 conventionally comprises a number of modules in addition to the equipment carried in the communications payload. This non-communication equipment includes power supplies (not shown), solar arrays 26, thruster propulsion systems (not shown), and many other components and instrumentation well known to those skilled in the art. The communications payload may generally include components related to non-optical communications, namely for radio-frequency communication with various entities, such as a central command facility (not shown) and the individual residential or commercial units 16. These non-optical communication components are represented schematically in FIG. 1 at 28.

The portion of the communications payload generally directed to optical communication will be referred to as the "optical communication terminal," which is represented schematically in FIG. 1 as an aperture 30 of a telescope. The aperture 30 establishes an interface for the transmission and reception of an optical data signal via the communication link 24. While equipment such as the telescope may be solely operated in connection with the optical communication terminal, it should be noted that the optical communication terminal may share components (e.g., a processor) with the other, radio-frequency-based communication equipment on the satellite terminal 12.

The present invention generally addresses the alignment calibration of the components of an optical communication terminal transmitting an optical data signal (hereinafter "the transmitting terminal"). The present invention also addresses the alignment of components in the optical communication terminal receiving an optical data signal (hereinafter "the receiving terminal"). The degree to which all of these components are appropriately aligned may be measured and evaluated in terms of the bit error rate of the transmission.

As is known to those skilled in the art, alignment of two optical communication terminals may begin with a rough calibration procedure. This procedure may include an actual repositioning of the entire terminal in, for example, a translational or rotational manner. The procedures available are, of course, determined by the propulsion systems provided on a particular satellite terminal 12. The present invention assumes that a rough calibration procedure has been executed, such that at least some portion of the transmitted beam is being received. Most, if not all, rough calibration procedures known to those skilled in the art are compatible with the present invention.

Having at least some degree of beam reception established via rough calibration, the present invention "fine-tunes" the alignment of the optical communication terminals "on-the-fly." That is, optimal alignment is accomplished while an actual optical data signal representative of content is being transmitted between the optical communication terminals. The portion of the optical data signal representative of such content is referred to as the "principal communication link." On-the-fly alignment avoids performing an extensive alignment procedure prior to transmission of any data on the principal communication link, only to find an inadequate bit error rate once actual transmission is initiated. In contrast, alignment calibration in accordance with the present invention allows the bit error rate of the transmission of actual data (rather than meaningless test data) to serve as the basis for the calibration. Moreover, on-the-fly alignment provides a mechanism for continuously updating the alignment without interrupting data transmission on the principal communication link to execute a test procedure. Still further, alignment according to the present invention may occur regardless of the type or presence of any communication traffic on the principal communication link.

On-the-fly alignment is accomplished by transmitting alignment information via modulation of the optical data signal with an alignment information signal transmitted at a subcarrier frequency. The subcarrier frequency is preferably high enough to carry the alignment information at a rate that accomplishes suitable alignment calibration. The subcarrier frequency may then be set even higher to allow for future modifications in the amount of information transmitted. For example, adequate alignment calibration has been found at alignment information transmission rates on the order of 100 bits/second. To accommodate that required transmission rate, the subcarrier frequency could be set to 1 kHz (1000 bits/second). In the interest of providing a flexible alignment system, the subcarrier frequency could then be set to 100 kHz, which corresponds to a data transfer rate of 100,000 bits/second. Raising the subcarrier frequency to the 100 kHz range is also preferable because lower frequency hardware is typically much larger in size and, therefore, undesirable for satellite applications.

The range of preferred subcarrier frequencies should also be much lower than the frequency of the optical data signal (i.e., the frequency of the principal communication link), which is generally in the terahertz range. With the subcarrier frequency so low relative to the principal communication link frequency, communication traffic on the principal communication link may be discontinuous and still support the transmission of alignment information. Moreover, the relative difference between the principal and subcarrier frequencies determines the ease at which the data content and alignment information may be separated during demodulation.

Lastly, the subcarrier frequency may also be selected in the interest of avoiding interference with other low frequencies also carrying data within the system. With these guidelines in mind, the subcarrier frequency is preferably about 3–5% of the principal frequency, which may result in a subcarrier frequency of about 90 kHz.

The principal frequency of the optical data signal is determined by the wavelength of the beam, which may be in a range from about 0.8 $\mu$m to about 1.5 $\mu$m. The beam wavelength, however, is preferably about 1.5 $\mu$m. The generation and transmission of the beam will be set forth in greater detail hereinbelow.

According to one embodiment of the present invention, the alignment information transmitted between optical communication terminals is generated during a scanning routine based on transmission at a plurality of offsets defined by a fixed scanning grid. The scanning routine starts from an initial alignment position and then transmits the optical data signal at a plurality of positions offset therefrom. The fixed scanning grid may provide a plurality of predetermined alignment offsets. The transmitted alignment information then comprises a tag identifying the alignment offset at which transmission is occurring.

The alignment offsets result in signal intensity variations, as determined by the receiving optical communication terminal. After measuring the intensity, the receiving terminal associates the tag identifying the alignment offset with the intensity data corresponding thereto, and transmits this alignment information back to the other optical communication terminal. Repeating this scanning routine results in a set of position-intensity data pairs from which an optimal alignment position may be determined. As will be explained further hereinbelow, a quadratic fit may be calculated to determine the peak intensity or optimal alignment position. The coefficients of the quadratic fit are determined through a linear least-squares analysis of the position-intensity data.

Figure 2:
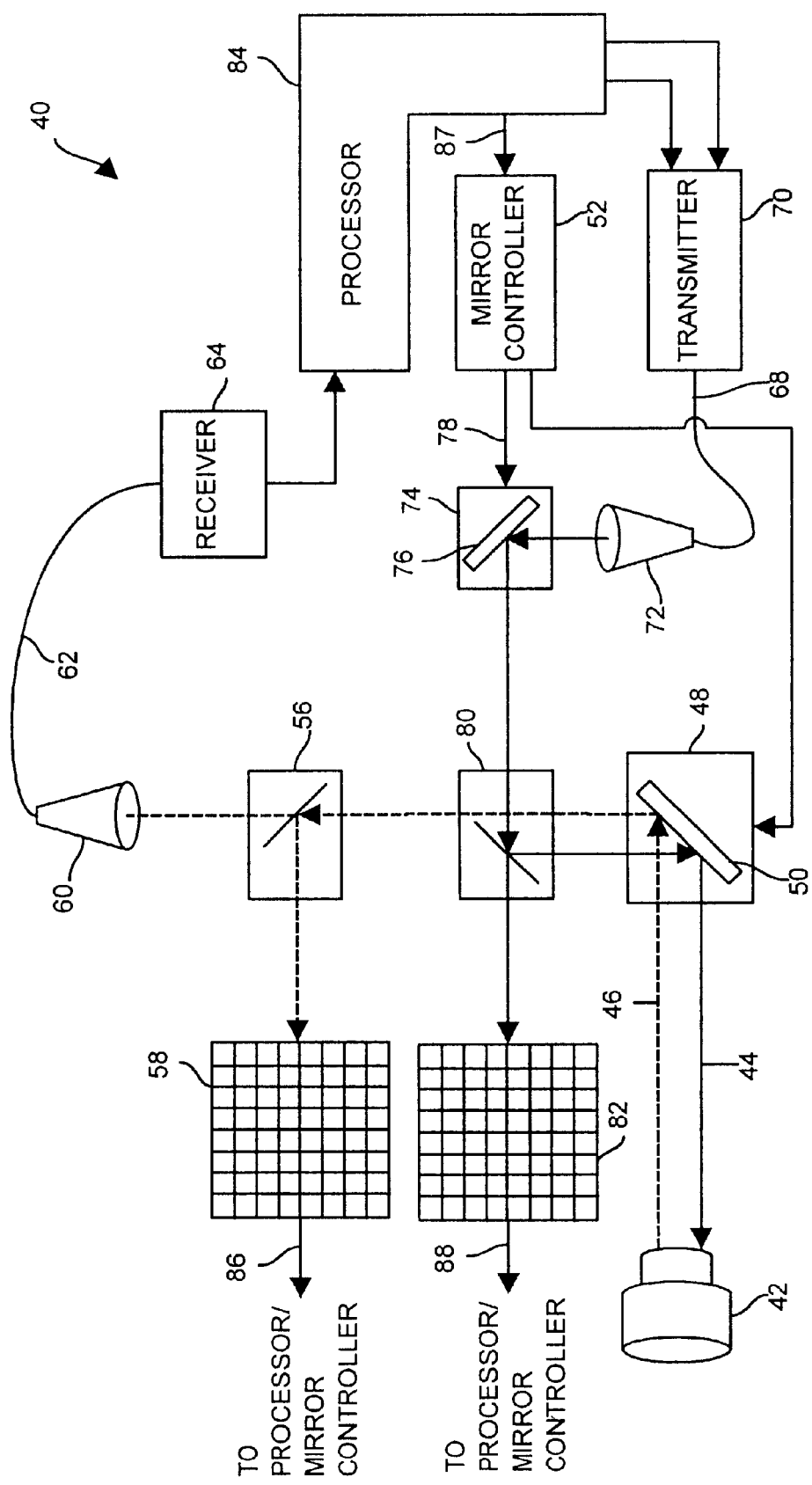
FIG. 2 is a schematic representation of an optical communication terminal of the communication system of FIG. 1 in accordance with the present invention.

The implementation of the scanning routine will now be described in the context of the components of an optical communication terminal. With reference to FIG. 2, an optical communication terminal indicated generally at 40 includes a telescope 42 that provides an optical I/O interface. That is, the telescope 42 may constitute the mechanism for transmitting as well as gathering optical signals. Alternatively, more than one telescope may be utilized to handle the two operations. As shown, however, the telescope 42 is in communication with both a transmit beam 44 and a receive beam 46 (shown in broken line). Implementation of the present invention is not dependent upon the type of telescope and, therefore, any telescope capable of transmitting and/or receiving optical data signals of the type identified hereinabove is suited for use with the present invention. Typical telescopes have a field of view on the order of several microradians, such as about 4 microradians.

Both the transmit beam 44 and the receive beam 46 are in communication with a steering mirror assembly 48. The steering mirror assembly 48 comprises a steering mirror 50 movably disposed within the assembly 48. The position of the steering mirror 50 is adjusted by an actuator that is typically disposed within the assembly 48. The actuator, in turn, is controlled by a mirror controller 52, which is shown in FIG. 2 as a distinct global controller for the entire optical communication terminal 40. Alternatively, the mirror controller 52 may have a distributed architecture within the terminal 40 such that components are dedicated to a particular assembly, such as the steering mirror assembly 48. Regardless of its physical construction and location, the controller 52 generally provides an electrical signal on a line 54 carrying information indicative of absolute or relative mirror position. The electrical signal may, for example, comprise an analog signal having a DC level representative of absolute mirror position. The actuator translates the electrical signal into a physical (e.g., pressure) signal that drives the steering mirror 50 to a particular position. The mirror controller 52 may be implemented in any suitable combination of hardware, software, or firmware.

The type of mirror actuator is not critical to practice of the present invention, so long as the actuator is capable of complying with a scan rate required by the system to perform the alignment calibration calculations in a reasonable time frame. The scan rate relates to the speed at which the actuator can modify the position of the mirror from a first scanning position to a second scanning position. The present invention has shown adequate alignment performance with scan rates of about 100 Hz. Mirror actuators having a higher bandwidth (e.g., 1000 Hz) may be utilized to obtain higher resolution performance results.

Beyond the steering mirror 50, the paths of the transmit beam 44 and the receive beam 46 diverge. With respect to the receive beam 46, the steering mirror 50 directs the beam 46 to a beam splitter assembly 56, which, in turn, directs a portion of the beam 46 to a receptor array 58. The beam splitter assembly 56 allows another portion of the receive beam 46 to pass through for reception by a receive fiber coupler 60 having a lens that focuses the receive beam 46 into a fiber 62. The fiber 62 couples the receive beam 46 to a receiver module 64.

The receptor array 58 comprises a grid of light receptors (not shown), each of which is coupled to a detection circuit (not shown) typically disposed on the rear face of the array 58. As is known to those skilled in the art, the detection circuit outputs a plurality of signals proportional to the optical signal striking the array 58. The size, sensitivity, and precision of the array should be suited for the desired resolution of the alignment calibration. It should be noted that additional receptor arrays (i.e., an "acquisition array") may be necessary to perform both the rough alignment calibration procedures.

The transmit beam 44 is generated in a fiber 68 by a transmitter module 70. The fiber 68 terminates at a fiber coupler or lens 72 that directs the transmit beam 44 to a transmit mirror assembly 74 having a transmit mirror 76. The transmit mirror assembly 74 and corresponding mirror 76 are similar in all respects to the aforementioned steering mirror assembly 48 and mirror 50. The transmit mirror 76 is positioned in the same manner by the mirror controller 52 as the steering mirror 50, but with a different electrical signal delivered to the actuator of the transmit mirror assembly 74 via a line 78. As with the steering mirror assembly 48, the transmit mirror assembly 74 typically has actuator or control components housed therein.

In general, the transmit mirror assembly 74 is responsible for establishing the direction of the transmit beam 46, regardless of the existence and/or positioning of the steering mirror 50. Thus, in optical communication terminals 40 having the above-described dual-mirror system, the alignment of the transmit mirror 76 is calibrated in accordance with the point-ahead angle. Consequently, the transmit mirror 76 may be referred to as the "point-ahead mirror" (PAM) 76. Furthermore, it shall be understood that "transmit mirror," as used herein, may refer to any mirror utilized in an optical communication system for the above-identified general purpose, regardless of the total number of mirrors in the system.

The point-ahead mirror 76 directs the transmit beam 44 to a beam splitter assembly 80 similar to the beam splitter assembly 56 in all pertinent respects. The beam splitter assembly 80 provides portions of the transmit beam 44 to a receptor array 82 and the steering mirror 50.

The receptor arrays 58 and 82 provide mirror position information for the steering mirror 50 and the point-ahead mirror 76 to a processor 84 via lines 86 and 88, respectively. The processor 84, among other things, generates commands to direct the mirror controller 52 for subsequent control of the mirror actuators.

The processor 84 and the mirror controller 52 may, in fact, be housed in a single, integrated processing unit. However, as separate components (as shown in FIG. 2), the processor 84 generates a control signal on a line 87 that causes the mirror controller 52 to generate an appropriate electrical signal for adjusting the position of either the steering mirror 50 or the point-ahead mirror 76. Alternatively, this control signal may constitute a signal internal to an integrated processing unit, and may be initiated via a command executed in a software routine stored in a memory (not shown) and configured to be run by the processor 84 or integrated processing unit.

Generally, the processor 84 performs calculations that determine the optimal alignment position for each mirror in the optical communication terminal 40. The processor 84 may, but need not, comprise a general-purpose, digital signal processor (DSP) configured to execute the procedures set forth hereinbelow, or an application-specific, integrated circuit (ASIC) designed to execute the same procedures via any combination of specialized hardware, software, and firmware. Such digital processors are particularly well-suited for the calculations required by certain embodiments of the present invention, inasmuch as the scanning routine preferably involves a discrete (rather than continuous) scan pattern. Whether general-purpose or ASIC, the processor 84 may utilize software and/or data stored in a memory (not shown) that may, but need not, be physically housed on the same chip as the processor 84. Generally, the processor 84 may comprise any combination of hardware, software, and firmware configured to execute the procedures described hereinbelow, and should not be limited to a particular physical implementation. It should be noted that the term "configured," as used herein, should be read broadly to apply to both programmable and hardwired configurations.

The processor 84 may constitute the same processing unit that handles the data content transmitted on the principal communication link. In this manner, implementation of the present invention does not require any additional processing hardware for handling the alignment information. Moreover, the general-purpose DSPs typically utilized for the principal communication link are very easily modified via appropriate programming. Still further, as will be described hereinbelow, the present invention may be practiced without requiring such DSPs to perform extensive calculations. Alternatively, the processor 84 comprises a processing unit that operates on analog input data. Such analog input data may, for instance, comprise a voltage or current level representative of alignment information (e.g., the intensity of an incoming optical data signal transmitted at a particular position).

The processor 84 is provided with input data primarily by the receiver module 64, which is shown in greater detail in FIG. 3. The components of the receiver module 64 (together with those of the transmitter module 70) may be physically disposed within a communications subsystem. The particular physical implementation of the receiver module 64, however, is not critical to the practice of the present invention. Accordingly, the below-described components of the receiver module 64 may be implemented in any combination of hardware, software, and firmware.

The receiver module 64 includes a signal detector 90 coupled to the fiber 62 by an optical low-noise amplifier 92. The signal detector 90 generally includes one or more light-sensitive elements (i.e., photodetectors) that translate the optical data signal into an electrical signal having an amplitude representative of the intensity of the optical signal. The signal detector 90 should have a sensitivity commensurate with the requirements of the principal communication link, such that the requisite capabilities of the signal detector 90 need not be driven by the specifications for the communication of the alignment information in accordance with the present invention. The low-noise amplifier 92 boosts the received signal to levels that can be detected by the signal detector 90, while adding very little noise to avoid corrupting the signal content.

The signal detector 90 may include components in addition to photodetectors in the event that the optical signal is a DPSK signal. More particularly, when the optical signal has been modulated according to a DPSK scheme, the signal detector 90 comprises an interferometer, which acts generally as an optical phase comparator to determine the phase difference changes in the optical signal, as is well known to those skilled in the art. The signal detector 90 then relies on a dual detector having two photodetectors to convert the detected optical power to a corresponding electrical signal. In an alternative embodiment, the optical signal has been modulated according to an on-off keying (OOK) scheme, and the signal detector 90 includes only a signal photodetector that directly receives the signal developed by the low-noise amplifier 92.

In either embodiment, the electrical signal developed by the signal detector 90 is then passed to an envelope detector 96 and a post-detection filter 98. The envelope detector 96 acts on the amplified signal with a demodulator 102 to extract the above-described alignment information for the transmitted optical data signal. As will be explained hereinbelow in connection with the transmitter module 70, the transmitted optical data signal was amplitude-modulated by the subcarrier signal carrying the alignment information. The amplitude modulation appears as a time-varying shift in the optical data signal at the frequency of the subcarrier signal. The envelope detector 96 isolates this time-varying shift, and develops an envelope signal for the demodulator 102, which, in turn, demodulates the envelope signal to determine the alignment information. Specifically, the demodulator 102 determines the frequency of the envelope signal, inasmuch as the alignment information has been represented via frequency modulation of the carrier signal. That is, two frequencies near the carrier frequency (e.g., 98.5 and 101.5 kHz) have been designated as representative of binary 0 and 1. In this manner, the demodulator 102 provides a digital alignment signal on a line 104 to the processor 84.

The post-detection filter 98 filters the amplified, electrical signal representative of the optical signal to remove any noise resulting from jitter, measurement noise, and other noise sources. The post-detection filter 98 prepares a filtered signal representative of the data content on the principal communication link for analysis by a demodulator (not shown) and eventually, the processor 84.

The receiver module 64 may also include a baseband amplifier (not shown) that receives the electrical signal developed by the photodetector(s) of the signal detector 90. The baseband amplifier prepares the electrical signal for processing by the envelope detector 96 and the post-detection filter 98.

A small fraction of the amplified optical data signal (e.g., 1%) is provided to an intensity measurement module 100 that develops a digital representation of the intensity of the optical data signal (as received) on a line 106. To this end, the intensity measurement module 100 has access to the incoming signal prior to the losses introduced by the other components of the receiver module 64. The intensity measurement is performed by the receiving satellite terminal 40 assisting another terminal 40 (i.e., the transmitting satellite terminal) with an alignment calibration of its point ahead mirror 76 in accordance with the present invention. In that capacity, the receiving terminal 40 determines the intensity of the received optical signal, and pairs the resulting intensity data with the alignment information recovered as a result of the demodulation performed by the demodulator 102. The alignment information in this case is a tag identifying an offset position at which the transmitting terminal 40 transmitted the optical data signal. The processor 84 or some other component in the communications subsystem may perform the pairing of the data. The offset-intensity data pair is then transmitted back to the transmitting terminal 40 as another packet of alignment information modulating the principal data signal at a subcarrier frequency. Eventually the offset-intensity data pair is utilized by the processor 84 of the transmitting terminal 40 to determine an optimal position for the point-ahead mirror 76.

The intensity measurement module 100 may also perform a measurement during a receive alignment calibration procedure. More particularly, alignment of the steering mirror 50 of the receiving terminal 40 is calibrated to ensure that an incoming beam is not only captured by the telescope 42, but also is focused by the lens 60 into the fiber 62. Such receive alignment calibration occurs entirely within a given terminal 40, and is based on an analysis of the intensity measurement provided by the intensity measurement module 100 in light of mirror position information generated by the detection array 58. The mirror position may be adjusted by one of a predetermined offsets. The processor 84 collects the intensity and mirror position information for one or more of the offsets to determine whether the steering mirror 84 is misaligned with the receive fiber 62. The processor 84 and the mirror controller 52 may then calibrate the alignment of the steering mirror 50 to maximize the power of the incoming optical data signal.

Alternatively, this receive alignment calibration procedure may be replaced by a nutating tracking system, which is well-known to those skilled in the art. Regardless of which procedure is utilized to align the components involved in receiving an incoming optical data signal, the procedure may not be implemented during alignment calibration of the point-ahead mirror 76 in a dual-mirror system such as the one shown in FIG. 2. In such dual-mirror systems, the position of the steering mirror 50 affects the direction of the transmitted optical data signal. Therefore, the position of the steering mirror 50 is preferably established via the above-described receive alignment calibration procedures prior to initialization of the scanning routine for the point-ahead mirror 76.

Assuming the two terminals 40 have executed their internal alignment procedures, the alignment calibration procedure may be initiated by one or both terminals. For ease in description only, it is assumed that only the transmitting terminal 40 is executing the scanning routine.

With reference now to FIG. 4, the transmitter module 70 of the transmitting terminal 40 includes a laser diode 110 that generates an optical signal having the characteristics set forth hereinabove. The optical signal is modulated by an optical signal modulator 112 in accordance with the primary data that forms the basis for the principal communication link between the two terminals 40. The optical signal modulator 112 modulates the optical signal according to either an OOK or DPSK modulation scheme. The incorporation of the subcarrier signal onto the optical signal depends on which modulation scheme is utilized for the primary data. Regardless of the modulation scheme, however, the primary data is provided on a line 114 to an adjustable gain control (AGC) circuit having a gain-adjustable amplifier 116. Amplification of the primary data is required to provide sufficient power to drive the optical signal modulator 112. In a conventional transmitter, the gain of the amplifier 116 is typically adjusted via a feedback loop of the AGC to provide a constant drive level to the modulator 112. The drive level would otherwise vary over varying data, temperature and other conditions.

The AGC circuit further includes a diode-based, RF detector 118 well known to those skilled in the art that converts the amplified primary data signal into a voltage level representative of the power of the amplified primary data signal. The voltage level is supplied to an op-amp circuit 120 for comparison with a reference voltage. The op-amp circuit 120 provides a feedback signal for adjusting the gain of the amplifier 116.

If the transmitter module 70 utilizes either (1) OOK modulation, or (2) DPSK modulation with a modulator such as a Mach-Zehnder modulator (as described hereinbelow), the output of the op-amp circuit 120 may be provided directly to the amplifier 116 to determine the gain level. In embodiments utilizing other DPSK schemes, the output of the op-amp circuit 120 is provided to the amplifier via an adder 122, which sums the feedback from the op-amp circuit 120 and the subcarrier signal. The subcarrier signal has been frequency-modulated in accordance with the alignment information and, as a result, may pass through a separate AGC circuit (not shown) similar to the AGC circuit devoted to the primary data signal.

The embodiment relying on transmission via OOK modulation will now be described in greater detail. After the alignment information is determined by the processor 84, the processor 84 generates control signals for the transmitter module 70 that vary a current input signal that determines the output of the laser diode 110. The control signals may actually constitute the current input signal, or be directly related thereto by further processing known to those skilled in the art. In any event, the output of the laser diode 110 is preferably proportional to the amplitude of the current input signal. Without any modulation, the current input signal is essentially an electrical version of the optical signal. This optical signal is generally a sinusoid varying at the frequency of the primary optical signal with an amplitude determined from the amplitude of the current input signal. When the optical signal modulator 112 institutes OOK modulation, the signal generated by the laser diode 110 is simply blocked for primary data equal to zero. The alignment information is then utilized by the processor 84 to modulate the current input signal in accordance with the subcarrier signal, which, in turn, has been frequency-modulated with the alignment information. In sum, varying the current input signal about its nominal setting produces a ripple on the output of the laser diode 110. The ripple on the current input signal then has a frequency representative of the alignment information.

The above-described method for directly varying the laser diode input signal may be utilized in a DPSK embodiment, provided that the optical signal modulator 112 does not generate too much phase corruption. A Mach-Zehnder modulator, for instance, may be utilized to maintain a sufficiently low level of phase corruption.

Otherwise, the AGC circuit in DPSK embodiments is modified as shown in FIG. 4 to modulate the optical data signal with the alignment information by changing the gain of the amplifier 116. The gain is modified in accordance with the subcarrier signal via the adder 122. The summation of the feedback signal in the AGC circuit and the subcarrier signal adjusts the drive level for the optical signal modulator 112, which results in a similar ripple on the normally constant-amplitude DPSK signal. The ripple effectively distorts the DPSK modulation, inasmuch as the phase shift never fully achieves 180° and, thus, the magnitude of the signal is no longer at its maximum. Such incomplete phase modulation is compensated for at the receiving terminal by limiting the depth of the ripple introduced by the alignment information to a small percentage of the DPSK amplitude, such as 5%. The dual detectors of the interferometer 90 then square the signal power to overcome the losses introduced by the components that perform the demodulation. Thus, any limit imposed on the ripple is dependent upon the design of the receiver, and may be higher or lower in alternative embodiments.

Absent the above-described modifications to incorporate the alignment information, the AGC loop is designed to maintain a constant drive level for the modulator 112, as is well-known to those skilled in the art. With the above-described modifications, however, the drive signal developed by the amplifier 116 varies as set forth above and is provided on a line 124 to the optical modulator 112. As a result, the optical data signal is effectively amplitude modulated by the subcarrier signal. This amplitude modulation produces an optical data signal in a fiber 126 having an envelope representative of the alignment information. More particularly, due to the aforementioned FSK modulation, the envelope is changing at the frequency of the subcarrier signal, as modulated by the alignment information. In essence, applying the alignment information to the optical data signal as an FSK-modulated subcarrier has modified the transfer function of the transmitter module 70 to support mirror alignment calibration. For these reasons, it shall be noted that little additional hardware is necessary to implement the present invention once the principal communication link is established.

The alignment information for the transmitting terminal may comprise a position or offset "tag" that identifies the absolute or relative position of the point-ahead mirror 76. This offset tag may be generated in a variety of ways from the position information gathered by the receptor array 82 of the transmitting terminal 40, as set forth hereinabove. For instance, the position information may be encoded in a fashion well known to those skilled in the art. Determination of the actual offset position, however, is described hereinbelow.

The offset tag for the transmitting terminal 40 is transmitted to the receiving terminal 40, which then uses its intensity measurement module 106 to determine the intensity of the optical data signal (as received). The intensity information generated by the intensity measurement module 106 is coupled to the offset tag, and incorporated into another subcarrier signal for transmission back to the transmitting terminal 40. The transmitting terminal 40 then evaluates and stores this alignment information (which now includes the intensity information) to proceed further with the scanning routine and alignment calibration.

In accordance with one embodiment of the present, the alignment calibration procedure repeats the above-described offset/intensity measurement sequence for a plurality of predetermined offset positions. These offset positions may be defined in a grid pattern 130 as shown in FIG. 5. The grid pattern 130 defines the offset positions at which the optical data signal is transmitted. In the embodiment shown in FIG. 5, nine offset positions 132 are defined relative to a boresite uncertainty region 134. The boresite uncertainty region 134 identifies the general area at which the transmitting terminal 40 believes its point-ahead mirror 76 is directing the optical data signal. Such information is provided by the receptor array 82 and analyzed by the processor 84 to generate the boresite uncertainty region 134. In this manner, the scanning routine accounts for not knowing the exact initial position due to the initial misalignments. Another offset position may be centered within the boresite uncertainty region 134, which may, but need not, have a circular shape.

The scanning routine according to the present invention is not limited to any particular grid pattern. The grid pattern 130 has been selected for its simplicity, in that it provides sufficient alignment information for adequate alignment calibration with a minimal amount of calculation complexity. In general, the grid pattern is selected in view of the expected beam shape, which may be, for instance, a Gaussian distribution. In that case, the grid pattern 130 provides uniform coverage in a two-dimensional layout. The simplicity provided by the layout, in turn, simplifies the subsequent calculations that determine the optimal mirror position from the alignment information.

Furthermore, the processor 84 may, but need not, utilize a discrete grid pattern such as the set of offset positions shown in FIG. 5. Thus, the transmitting terminal 40 may calibrate the alignment by a continuous scan that transmits the optical data signal while the mirror position is continuously being modified (i.e., offset). With such continuous scans, the offset information is still periodically and/or continuously transmitted to the receiving terminal as alignment information via a subcarrier as set forth hereinabove.

Figure 6:
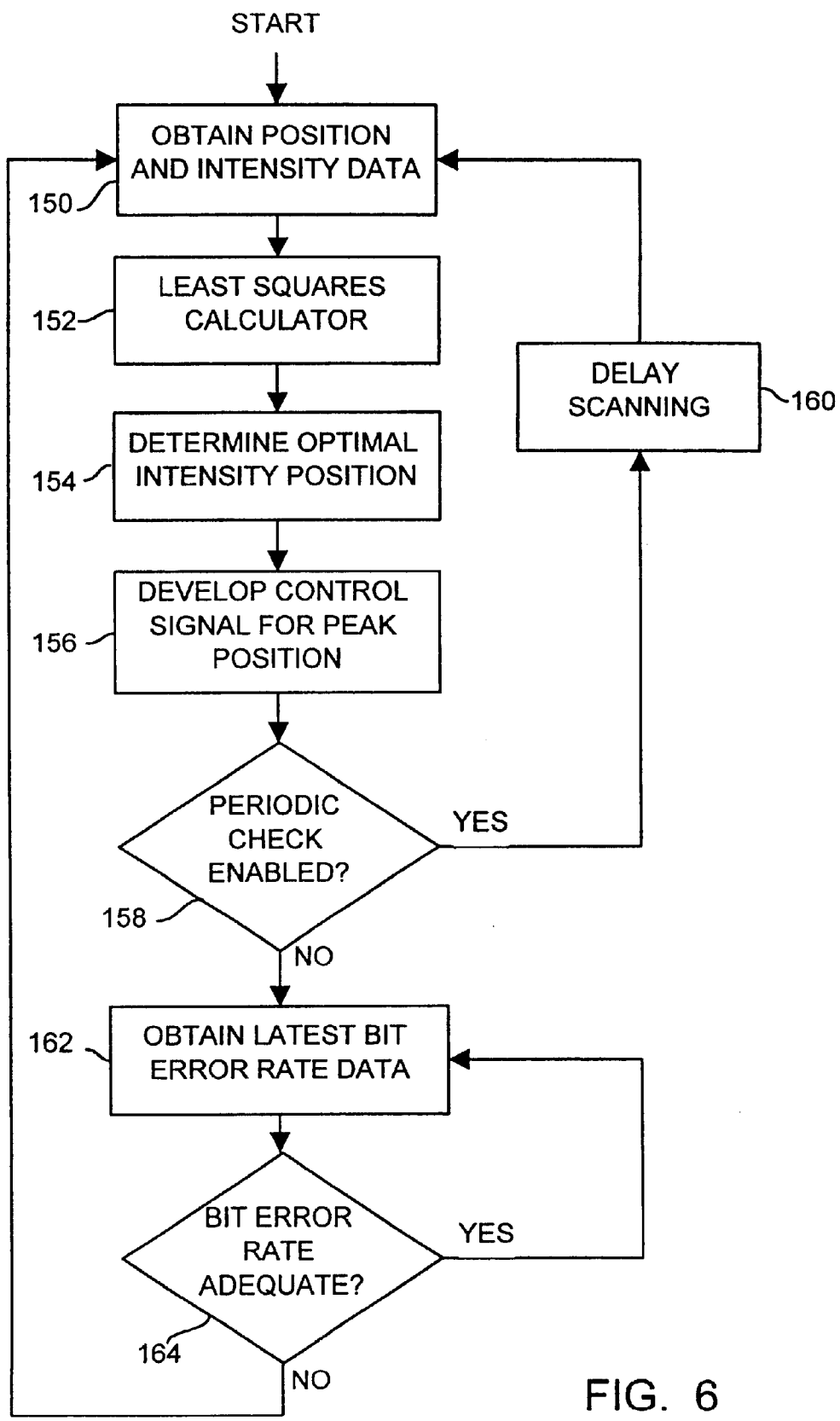
FIG. 6 is a flowchart illustrating an alignment calibration process executed by a processor of the optical communication terminal of FIG. 2.

With reference now to FIG. 6, the steps taken by the processor 84 in implementing a preferred embodiment of the scanning routine are set forth. As described above, the processor 84 obtains in a block 150 all of the alignment information, namely the respective offset positions and corresponding intensity measurements resulting from transmission according to the grid pattern 130. To this end, the processor 84 is configured to provide appropriate control signals to the mirror controller 52 to adjust the position of the point-ahead mirror 76 to each alignment offset position in the grid pattern 130. As the processor 84 obtains the alignment information, data representative thereof may be stored in a memory (not shown) for subsequent evaluation and use. It should be noted that the intensity measurements may be repeated any number of times during execution of the block 150 for a variety of reasons, including transmission errors and noise correction. Next, the processor 84 performs a linear least-squares calculation in a block 152 to fit the alignment information to the following bi-quadratic (i.e., parabolic) equation:

$$z_i = c_1(x_i - x_0)^2 + c_1(y_i - y_0)^2 + c_2$$

where $z_i$ is the measured log intensity value at the offset position, and x and $y_i$ are the azimuth and elevation offsets, respectively, that define the offset position. Under ideal circumstances (i.e., no jitter or measurement noise, together with a Gaussian beam distribution), the above-identified parabolic fit provides perfect prediction of the peak intensity and, therefore, the optimal mirror position. The least-squares fit to the parabolic equation is designed to account for the effects of jitter, measurement noise, thermal misalignments, and Airy beam profiles, and thereby reduce any error in alignment to an arbitrarily low level.

The least-squares calculation may be handled by low complexity operations in the processor 84. Specifically, with the scanning grid predetermined (and fixed) as set forth above, the required matrix inversion may be precomputed and stored in the memory associated with the processor 84. It should be noted that the constant $c_2$ need not be used in accordance with some embodiments.

In general, fitting the alignment information to the parabolic equation results in estimates for the coefficients $c_1$ and $c_2$. The processor 84 then may use these estimates to determine the optimal alignment position for the point-ahead mirror 76, as defined by the parameters $x_0$ and $y_0$. More particularly, using the estimated coefficients of the parabolic equation, simple algebraic computations that determine the peak of the parabola are performed in a block 154. This peak corresponds with the mirror position at which the intensity is at a maximum.

The alignment information may alternatively be fit to equations more complicated than the bi-quadratic equation. For instance, the computation of the optimal alignment position may generally incorporate an equation-fitting routine that involves any number of variables. More complicated equations may, in turn, provide more accurate estimates of the received intensity, which, in turn, would lead to a more accurate determination of the optimal mirror position. As a result, the bit error rate for the principal communication link may decrease, but at the cost of increased demands on the processor 84, which may be shared by the rest of the communications module.

The least-squares analysis provides the flexibility for extending the scanning routine to multiple scans, i.e., where intensity measurements are re-taken for the plurality of offset positions. Multiple scans provide the processor 84 with a data set for each offset position, thereby providing for the averaging-out of the effects of rapid jitter and measurement noise. To further reduce measurement error, each additional scanning pass may take a different route through the scanning grid to compensate for the effects of scanning dynamics, actuator nonlinearities, and friction.

It should also be noted that the alignment information may include one or more parity check bits for each transmitted byte of alignment information to ensure data integrity. If a parity check failure is detected by the processor 84, the data for the entire grid pattern may be discarded. In this manner, the least-squares analysis and other processing need not account for errors resulting from the transmission of the alignment information itself.

Once the processor 84 has determined an optimal alignment position, the processor 84 generates in a block 156 a control signal that directs the mirror controller 52 to reposition the point-ahead mirror 76 accordingly. At this point, the processor 84 may be programmed to determine in a block 158 whether the alignment calibration procedure is to be executed continuously or periodically. This inquiry provides the processor 84 with an opportunity to delay in a block 160 any further scanning until some future time. The scanning routine may, therefore, be suspended until a predetermined period of time elapses or until some other control condition is satisfied.

When the alignment calibration procedure is to be executed continuously, the processor 84 may immediately return control to the block 150 or, alternatively, obtain in a block 162 the latest performance data relating to the bit error rate for the principal communication link. The latest bit error rate may be compared to a threshold in a block 164 or be otherwise evaluated to determine whether the terminals 40 are in adequate alignment. In the event that the bit error rate is sufficiently low, execution of the alignment calibration procedure may be delayed by passing control back to the block 162 for further analysis of the bit error rate. If, for some reason, the bit error rate is inadequate, the processor 84 may initialize the scanning routine by beginning to obtain alignment information utilizing the predetermined grid pattern.

Numerous other modifications and alternative embodiments of the invention will be apparent to those skilled in the art in view of the foregoing description. Accordingly, this description is to be construed as illustrative only. The details of the device and method may be varied substantially without departing from the spirit of the invention, and the exclusive use of all modifications which are within the scope of the appending claims is reserved.

What is claimed is:

1. An alignment calibration system for use in a first optical communication terminal communicating with a second optical communication terminal, comprising:

a modulator that modulates a first data signal with a first alignment signal representative of an alignment offset taken by the first optical communication terminal during transmission of the first data signal by the first optical communication terminal to the second optical communication terminal;

a demodulator responsive to a second data signal transmitted by the second optical communication terminal wherein the demodulator develops a second alignment signal representative of the alignment offset taken by the first optical communication terminal and an intensity of the first data signal as received by the second optical communication terminal;

a processor coupled to the demodulator and configured to determine an optimal alignment position from the alignment offset and the intensity.

2. The alignment calibration system of claim 1, wherein the alignment offset is one of a plurality of predetermined alignment offsets.

3. The alignment calibration system of claim 2, wherein the processor comprises a least-squares calculator such that the processor determines the optimal alignment position via a parabolic fit to intensity values corresponding with transmission at the plurality of predetermined alignment offsets.

4. The alignment calibration system of claim 1, wherein the first alignment signal modulates the first data signal at a subcarrier frequency.

5. The alignment calibration system of claim 4, wherein the modulator comprises an FSK modulator that generates the first alignment signal from the alignment offset.

6. The alignment calibration system of claim 5, wherein the first data signal comprises a DPSK signal.

7. A method of aligning a first communication terminal with a second communication terminal for optical transmission of data between the first communication terminal and the second communication terminal, the method comprising the steps of:

(a) adjusting a mirror of the first communication terminal to a first position;

(b) modulating a first optical signal representative of the data in accordance with the first position;

(c) transmitting the first optical signal from the first communication terminal to the second communication terminal;

(d) receiving a second optical signal from the second communication terminal to obtain an intensity of the first optical signal as received by the second communication terminal; and (e) adjusting the mirror of the first communication terminal to a second position.

8. The method of claim 7, wherein at least one of the first position and the second position is determined via one of a plurality of offsets.

9. The method of claim 8, wherein the plurality of offsets are predetermined.

10. The method of claim 7, further comprising the step of demodulating the second optical signal to obtain the first position and the intensity wherein the second optical signal is representative of further data being communicated between the first communication terminal and the second communication terminal.

11. The method of claim 7, wherein step (b) comprises the step of translating the first position onto a subcarrier frequency of the first optical signal.

12. The method of claim 7, wherein step (e) comprises the step of estimating an optimal position based on the intensity.

13. The method of claim 12, wherein the estimating step comprises the step of generating a quadratic fit via a least-squares calculation.

14. A method of aligning a first communication terminal and a second communication terminal, the method comprising the steps of:

(a) adjusting a mirror of the first communication terminal to a plurality of predetermined offset positions from a first position;

(b) transmitting, for each predetermined offset position, a respective first optical signal from the first communication terminal to the second communication terminal wherein each first optical signal is representative of the corresponding predetermined offset position;

(c) receiving, for each predetermined offset position, a respective second optical signal from the second communication terminal to the first communication terminal wherein each second optical signal is representative of a respective intensity of the corresponding first optical signal as received by the second communication terminal; and (d) adjusting the mirror of the first communication terminal to a second position based on the plurality of predetermined offset positions and the corresponding received intensities.

15. The method of claim 14, wherein step (d) comprises the steps of:

generating an intensity estimation function from the plurality of predetermined offset positions and the corresponding intensities; and determining an optimal mirror position from the intensity estimation function.

16. The method of claim 15, wherein the intensity estimation function generating step comprises the step of computing a parabolic fit for the intensities as received by the second communication terminal.

17. The method of claim 16, wherein the computing step comprises the step of calculating coefficients for the parabolic fit via least-squares analysis.

18. The method of claim 14, wherein step (b) comprises the step of modulating an optical carrier signal with a subcarrier signal representative of the corresponding predetermined offset position to generate each first optical signal.

19. The method of claim 18, wherein the optical carrier signal is representative of data transmitted between the first communication terminal and the second communication terminal.

20. The method of claim 14, wherein:

step (c) comprises the step of demodulating an optical carrier signal with a subcarrier signal representative of the respective predetermined offset position and the corresponding received intensity; and the optical carrier signal is representative of data transmitted between the first communication terminal and the second communication terminal.

21. A method of controlling a mirror positioning system for an optical communication terminal, the method comprising the steps of:

(a) receiving intensity data associated with optical transmission of content at a plurality of mirror offset positions established by the mirror positioning system; and (b) determining an optimal mirror position to maximize transmission intensity via a parabolic fit of the intensity data.

22. The method of claim 21, wherein the plurality of mirror offset positions are predetermined.

23. The method of claim 21, wherein the receiving step includes the step of demodulating an optical signal representative of the content and having the intensity data modulated on a subcarrier frequency.

24. The method of claim 21, wherein the determining step includes the step of calculating coefficients for the parabolic fit by least-squares analysis of the intensity data.

25. The method of claim 21, further comprising the step of transmitting an optical signal modulated by an alignment signal representative of the mirror offset position of the plurality of mirror offset positions at which the optical signal is transmitted.

\* \* \* \* \*